US012495464B2

(12) United States Patent
Kang et al.

(10) Patent No.: US 12,495,464 B2
(45) Date of Patent: Dec. 9, 2025

(54) OPERATION METHOD OF USER EQUIPMENT USING CONNECTED MODE DISCONTINUOUS RECEPTION

(71) Applicant: SAMSUNG ELECTRONICS CO., LTD., Suwon-si (KR)

(72) Inventors: Inheon Kang, Suwon-si (KR); Kyunghwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 495 days.

(21) Appl. No.: 18/054,579

(22) Filed: Nov. 11, 2022

(65) Prior Publication Data

US 2023/0156600 A1 May 18, 2023

(30) Foreign Application Priority Data

Nov. 15, 2021 (KR) .................. 10-2021-0157107
Jun. 24, 2022 (KR) .................. 10-2022-0077804

(51) Int. Cl.
*H04W 76/28* (2018.01)
*H04W 24/10* (2009.01)
*H04W 52/02* (2009.01)

(52) U.S. Cl.
CPC ........... *H04W 76/28* (2018.02); *H04W 24/10* (2013.01); *H04W 52/0216* (2013.01); *H04W 52/0232* (2013.01)

(58) Field of Classification Search
CPC . H04W 52/0232; H04W 24/10; H04W 24/08; H04W 52/0216; H04W 52/0251;
(Continued)

(56) References Cited

U.S. PATENT DOCUMENTS 9,860,804 B2   1/2018 Wu et al.
10,805,979 B2  10/2020 Chakraborty et al.
(Continued)

FOREIGN PATENT DOCUMENTS

EP         3138351         3/2017

OTHER PUBLICATIONS

European Search Report dated Mar. 20, 2023 in corresponding European Patent Application No. 22207407.2 (10 pages).
(Continued)

*Primary Examiner* — Michael K Phillips
(74) *Attorney, Agent, or Firm* — Morgan, Lewis & Bockius LLP

(57) ABSTRACT

The devices, systems, methods, and techniques described herein provide for efficient operation of a user equipment (UE) configured to support mobility mechanisms while using connected mode discontinuous reception (CDRX). In some aspects, a UE configured to use CDRX may measure objects according to a No DRX minimum measurement period (e.g., a minimum measurement period configured when no DRX is used). Because the No DRX minimum measurement period may be shorter than a DRX minimum measurement period, the UE may be able to measure objects more frequently and improve mobility performance. Further, although the UE may perform measurements according to the No DRX minimum measurement period, the UE may still report the measurements according to a DRX minimum measurement period. Thus, the UE may report measurements less frequently, and the UE may sleep during more off-durations of a CDRX cycle, resulting in reduced power consumption.

19 Claims, 12 Drawing Sheets

(58) Field of Classification Search
CPC ... H04W 52/0274; H04W 76/28; Y02D 30/70
See application file for complete search history.

(56) References Cited

U.S. PATENT DOCUMENTS

| | | | |
|---|---|---|---|
| 10,856,358 B2 | 12/2020 | Zhang et al. | |
| 2013/0315157 A1* | 11/2013 | Krishnamurthy | H04L 5/0073 370/329 |
| 2015/0133061 A1* | 5/2015 | Wu | H04W 36/0088 455/67.11 |
| 2015/0327249 A1* | 11/2015 | Kitazoe | H04W 52/50 370/329 |
| 2016/0295636 A1* | 10/2016 | Yang | H04W 52/0264 |
| 2017/0019852 A1* | 1/2017 | Yang | H04W 52/0216 |
| 2017/0026861 A1 | 1/2017 | Tseng et al. | |
| 2017/0026948 A1 | 1/2017 | Yang et al. | |
| 2018/0176810 A1* | 6/2018 | Thangarasa | H04W 76/11 |
| 2018/0213482 A1 | 7/2018 | Dortmund et al. | |
| 2018/0255607 A1* | 9/2018 | Nagaraja | H04L 5/0053 |
| 2019/0313475 A1* | 10/2019 | Siomina | H04W 76/28 |
| 2019/0373668 A1 | 12/2019 | Wang et al. | |
| 2020/0396684 A1 | 12/2020 | Lin et al. | |
| 2021/0084516 A1 | 3/2021 | Rungta et al. | |
| 2023/0199909 A1* | 6/2023 | Mohammad | H04W 52/0216 370/329 |
| 2024/0056931 A1* | 2/2024 | Lin | H04W 36/305 |

OTHER PUBLICATIONS

5G; NR; "Requirements for support of radio resource management", (3GPP TS 38.133 version 16.4.0 Release 16), (Sep. 2020), 1465 pages.

\* cited by examiner

FIG. 3

Table 9.2.5.2-1: Measurement period for intra-frequency measurements without gaps (FR1)

| DRX cycle | $T_{SSB\_measurement\_period\_intra}$ |
|---|---|
| No DRX | $\max(200ms, \text{ceil}(5 \times K_p) \times SMTC\ period)^{Note\ 1} \times CSSF_{intra}$ |
| DRX cycle ≤ 320ms | $\max(200ms, \text{ceil}(1.5 \times 5 \times K_p) \times \max(SMTC\ period, DRX\ cycle)) \times CSSF_{intra}$ |
| DRX cycle > 320ms | $\text{ceil}(5 \times K_p) \times DRX\ cycle \times CSSF_{intra}$ |

OPERATION METHOD OF USER EQUIPMENT USING CONNECTED MODE DISCONTINUOUS RECEPTION

CROSS-REFERENCE TO RELATED APPLICATIONS

This application is based on and claims priority under 35 U.S.C. § 119 to Korean Patent Application No. 10-2021-0157107, filed on Nov. 15, 2021 in the Korean Intellectual Property Office, and 10-2022-0077804, filed on Jun. 24, 2022 in the Korean Intellectual Property Office, the disclosures of which are incorporated by reference herein in their entireties.

BACKGROUND

One or more aspects of the present disclosure relate to a method of operating a user equipment (UE), and more particularly, to a method of operating a UE using Connected Mode Discontinuous Reception (CDRX).

In some wireless communications systems, it may be appropriate to reduce (e.g., minimize) power consumption at a UE, while increasing (e.g., maximizing) throughput at the UE. Accordingly, various technologies have been developed for reducing power consumption at a UE and increasing throughput at a UE. For instance, CDRX may be used as a method of reducing power consumption, and mobility (e.g., handovers) may be used to increase throughput. CDRX is a Discontinuous Reception (DRX) method. When a UE is connected to a base station, but the base station and the UE are not exchanging data, the UE may sleep during off-durations of a CDRX cycle to reduce power consumption. However, if sleeping during off-durations of a CDRX cycle is prioritized over mobility to reduce power consumption, the throughput at a UE may degrade (e.g., due to degraded mobility performance). Conversely, if mobility performance is prioritized over sleeping during off-durations of a CDRX cycle, the power consumption at the UE may increase. In other words, there may be a trade-off between the power consumption at the UE and the throughput at the UE. Improved techniques for optimizing operation in a CDRX mode (e.g., to reduce power consumption at a UE and increase throughput at the UE) may be desirable.

SUMMARY

One or more aspects of the present disclosure are related to operating a user equipment using Connected Mode Discontinuous Reception (CDRX).

One or more aspects of the present disclosure are not limited to the systems, methods, devices, or techniques described herein, and other systems, methods, devices, or techniques will be clearly understood (e.g., by analogy) by those skilled in the art from the following description.

According to an aspect of the present disclosure, a method of wireless communications includes using CDRX, measuring objects based on a minimum measurement period configured when no discontinuous reception (DRX) is used, where the minimum measurement period includes a No DRX minimum measurement period, determining whether there are measurement results of objects to be reported to a base station, and when there are no measurement results of objects to be reported to the base station, sleeping based on a DRX cycle.

According to another aspect of the present disclosure, a method of operating a user equipment (UE) includes using CDRX, measuring objects based on a minimum measurement period configured when no DRX is used, where the minimum measurement period includes a No DRX minimum measurement period, determining whether the DRX minimum measurement requirement is satisfied, and sleeping based on a result of the.

According to another aspect of the present disclosure, a method of wireless communications includes using CDRX, measuring objects based on a minimum measurement period configured when no DRX is used, where the minimum measurement period includes a No DRX minimum measurement period, determining whether there is a periodic measurement report to be reported or a measurement report according to the Time To Trigger (TTT) to be reported, and sleeping based on the determination.

According to another aspect of the present disclosure, a method of wireless communications includes determining a CDRX cycle of a CDRX mode, the CDRX cycle comprising on-durations and off-durations, measuring objects during an on-duration of the CDRX cycle based at least in part on a minimum measurement period configured when no DRX is used, wherein the minimum measurement period comprises a No DRX minimum measurement period, determining, before an off-duration of the CDRX cycle and based at least in part on measuring the objects, to report measurement results of the objects to a base station, and skipping sleep during the off-duration of the CDRX cycle based at least in part on determining to report the measurement results of the objects to the base station.

BRIEF DESCRIPTION OF THE DRAWINGS

One or more aspects of the present disclosure may be more clearly understood from the following detailed description taken in conjunction with the accompanying drawings.

FIG. 3 is a table illustrating measurement period information according to one or more aspects of the present disclosure.

DETAILED DESCRIPTION

Figure 1:
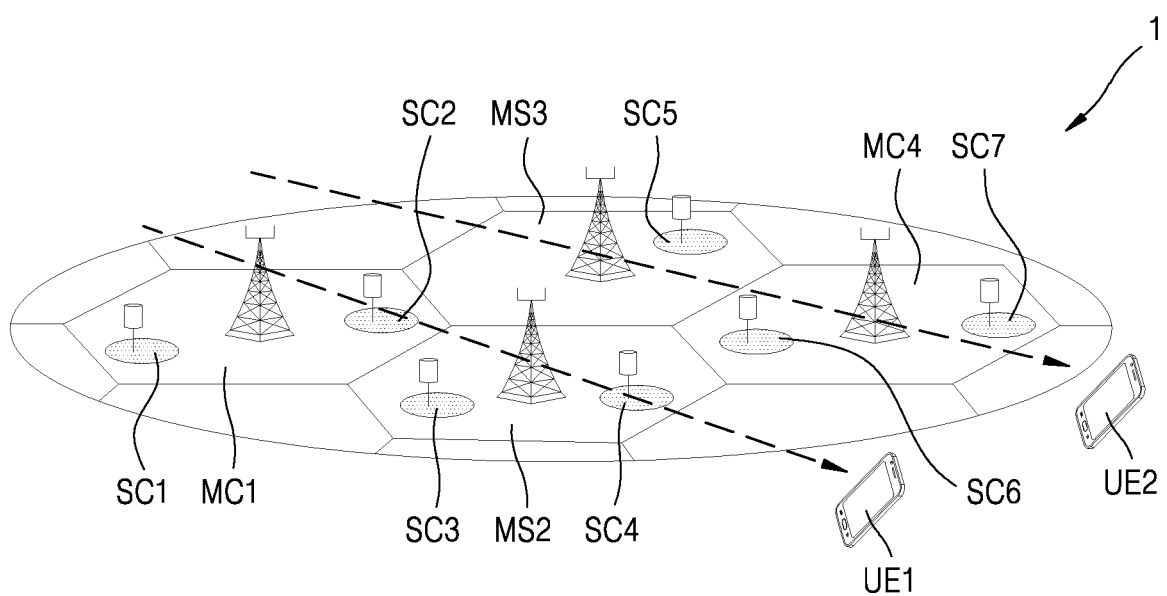
FIG. 1 is a block diagram illustrating a communication system according to one or more aspects of the present disclosure.

Some wireless communications systems may support mobility mechanisms (e.g., network handover mechanisms) where a user equipment (UE) connected to (e.g., communicating with) one base station may be handed over (e.g., moved) to another base station (e.g., for future communications). The UE may be configured to perform measurements on one or more base stations, and the measurements may be used to initiate a handover to one of the one or more base stations. In an example, the UE may be configured with objects (e.g., measurement objects) corresponding to resources including reference signals from each of the one or more base stations, the UE may perform measurements on the measurement objects, and the measurements may be used to determine whether to initiate a handover of the UE to one of the one or more base stations. By supporting mobility, a UE may maintain a high quality of communications with a network. For instance, the UE may switch from communicating with a first base station to communicating with a second base station when the quality of communications (e.g., signal quality) with the first base station deteriorates or the quality of communications (e.g., signal quality) with the second base station improves.

Some wireless communications systems may also support discontinuous reception (DRX). A UE operating in a DRX mode may operate according to a DRX cycle. The DRX cycle may include on-durations and off-durations, and the UE may be configured to sleep during off-durations of the DRX cycle and wake up during on-durations of the DRX cycle. Sleeping during off-durations of the DRX cycle may refer to avoiding monitoring for signaling from a base station (e.g., powering down or powering off one or more components of a receive chain or a transmit chain), and waking up during on-durations of the DRX cycle may refer to monitoring for signaling from a base station. Thus, during off-durations, a UE may not be configured or scheduled to communicate with a base station, and the UE may save power by operating in the DRX mode. A UE in a wireless communications system may be configured to operate without using DRX (e.g., no DRX), operate in a DRX mode according to a short DRX cycle (e.g., with a period that is less than or equal to a predefined threshold), or operate in a DRX mode according to a long DRX cycle (e.g., with a period that is greater than a predefined threshold). One example of DRX is connected mode DRX (CDRX) where a UE may utilize DRX in a connected mode (e.g., after establishing a connection with a base station).

In some wireless communications systems, a UE supporting mobility mechanisms may also be capable of utilizing (e.g., using) CDRX. The implementation of mobility mechanisms may allow the UE to maintain a high quality of communications with a network by selecting a suitable base station (e.g., associated with a high signal quality) with which the UE may communicate. In addition, operating in a CDRX mode may allow the UE to save power while still maintaining communications with a network. In some examples, however, it may be challenging for a UE supporting mobility mechanisms to also utilize CDRX. For instance, the UE may not be able to perform and report measurements for mobility during off-durations of a CDRX cycle. Thus, if the UE is configured to sleep more frequently, the UE may not be able to maintain high mobility performance. Alternatively, if the UE is configured to sleep less frequently, the UE may save less power. Thus, there may be a trade-off between implementing mobility mechanisms and utilizing CDRX, and, without an appropriate balance, a UE may experience high power consumption, low throughput, or both.

The devices, systems, methods, and techniques described herein provide for efficient operation of a UE configured to support mobility mechanisms while using CDRX. In some aspects, a UE configured to use CDRX may measure objects according to a minimum measurement period for No DRX (e.g., a minimum measurement period configured when no DRX is used). Such a minimum measurement period may be referred to as a No DRX minimum measurement period. Because the No DRX minimum measurement period may be shorter than a DRX minimum measurement period, the UE may be able to measure objects more frequently and improve mobility performance. Further, although the UE may perform measurements according to the No DRX minimum measurement period, the UE may still report the measurements according to a DRX minimum measurement period. Thus, the UE may report measurements less frequently than the UE is capable of performing measurements. As a result, the UE may not have to skip sleeping frequently to report measurements. Instead, the UE may sleep during more off-durations of a CDRX cycle, and the UE may experience increased power savings.

In some examples, a UE may rely on status information from a modem to determine an appropriate balance between mobility performance and using CDRX. The status information from the modem may include reference signal received power (RSRP) information, reference signal received quality (RSRQ) information, signal to interference noise ratio (SINR) information, and/or regional information. If the status information indicates that the quality of communications between the UE and a base station is high or is likely to be high (e.g., RSRP, RSRQ, or SINR is high or the UE is in a region associated with high quality communications), the UE may sleep more frequently and prioritize power savings. Alternatively, if the status information indicates that the quality of communications between a UE and a base station is low or is likely to be low (e.g., RSRP, RSRQ, or SINR is low or the UE is in a region associated with low quality communications), the UE may sleep less frequently and prioritize more efficient mobility (e.g., mobility performance).

Hereinafter, one or more aspects of the present disclosure will be described in detail with reference to the accompanying drawings.

FIG. 1 is a block diagram illustrating a communication system 1 according to one or more aspects of the present disclosure.

One or more aspects of the present disclosure may be applicable to both a homogeneous network composed of cells of the same type and a heterogeneous network composed of cells of different types. The communication system 1, as a non-limiting example, may include a 5th Generation (5G) system, a Long Term Evolution (LTE) system, a Code Division Multiple Access (CDMA) system, a Global System for Mobile Communications (GSM) system, a Wireless Local Area Network (WLAN) system, or any other wireless communications system.

The communication system 1 may be an example of a 5G system, an LTE system, or a system capable of supporting 5G and LTE-based communication, but it will be understood that one or more aspects of the present disclosure are not limited thereto.

In FIG. 1, the communication system 1 may include a plurality of macro cells MC1 to MC4, a plurality of small cells SC1 to SC7, and first and second UEs UE1 and UE2. The first and second UEs UE1 and UE2 may be wireless communications devices, may be mobile, and may transmit and receive data and/or control information by communicating with the macro cells MC1 to MC4 and the small cells SC1 to SC7. The first and second UEs UE1 and UE2 may be referred to as, for example, User Equipment, Mobile Stations (MS), Mobile Terminals (MT), User Terminals, Subscribe Stations (SS), wireless devices, handheld devices, or the like.

Macro cells MC1 to MC4 and small cells SC1 to SC7 may be referred to as fixed stations that generally communicate with the first and second UEs UE1 and UE2 and/or other cells and may exchange data and control information by communicating with the first and second UEs UE1 and UE2 and/or other cells. The macro cells MC1 to MC4 may provide communication coverage in a larger coverage area than the small cells SC1 to SC7. A coverage area may refer to a range in which a predetermined cell may provide a network to a user (or UE).

The macro cells MC1 to MC4 and the small cells SC1 to SC7 may be referred to as, for example, base stations, Nodes B, evolved-Nodes B (eNB), sectors, sites, base transceiver systems (BTS), and Access Points (AP), Relay Nodes, Remote Radio Heads (RRH), Radio Units (RU), etc.

On the other hand, although the communication system 1 in FIG. 1 is illustrated as including only macro cells MC1 to MC4 and small cells SC1 to SC7 corresponding to different coverage areas, this is an example and is not limited thereto. For instance, the communication system 1 may further include a mega cell, a micro cell, a pico cell, a femto cell, and the like respectively providing communication coverage in coverage areas of various sizes.

Due to the mobility of the first and second UEs UE1 and UE2, handover may occur from a macro cell to a macro cell, from a macro cell to a small cell, from a small cell to a macro cell, or from a small cell to a small cell. In some examples, one or more operations of the first UE UE1 may be described, but one or more aspects of the present disclosure applied to the first UE UE1 may also be applied to the second UE UE2.

The first UE UE1 may be currently connected via a Radio Resource Control (RRC) connection to a first source cell (or a first serving cell) that provides a network service, and the first UE UE1 may receive an RRC reconfiguration message including a measurement configuration from the first source cell. The measurement configuration may include a list of objects (e.g., measurement objects indicating resources that include reference signals for measurement) listed in an order for measurement. The list of objects may include at least one object for each of one or more candidate cells to which the first UE UE1 may be handed over from the first source cell. The object may be a target to be searched for or measured. For example, by measuring the objects, the first UE UE1 may determine whether there is a cell with which a quality of communication is better than a cell with which the first UE UE1 is currently communicating.

In some examples, measuring an object may be defined as measuring the strength of an electric field of the object by receiving a predetermined reference signal through a frequency band paired with the object.

Figure 2:
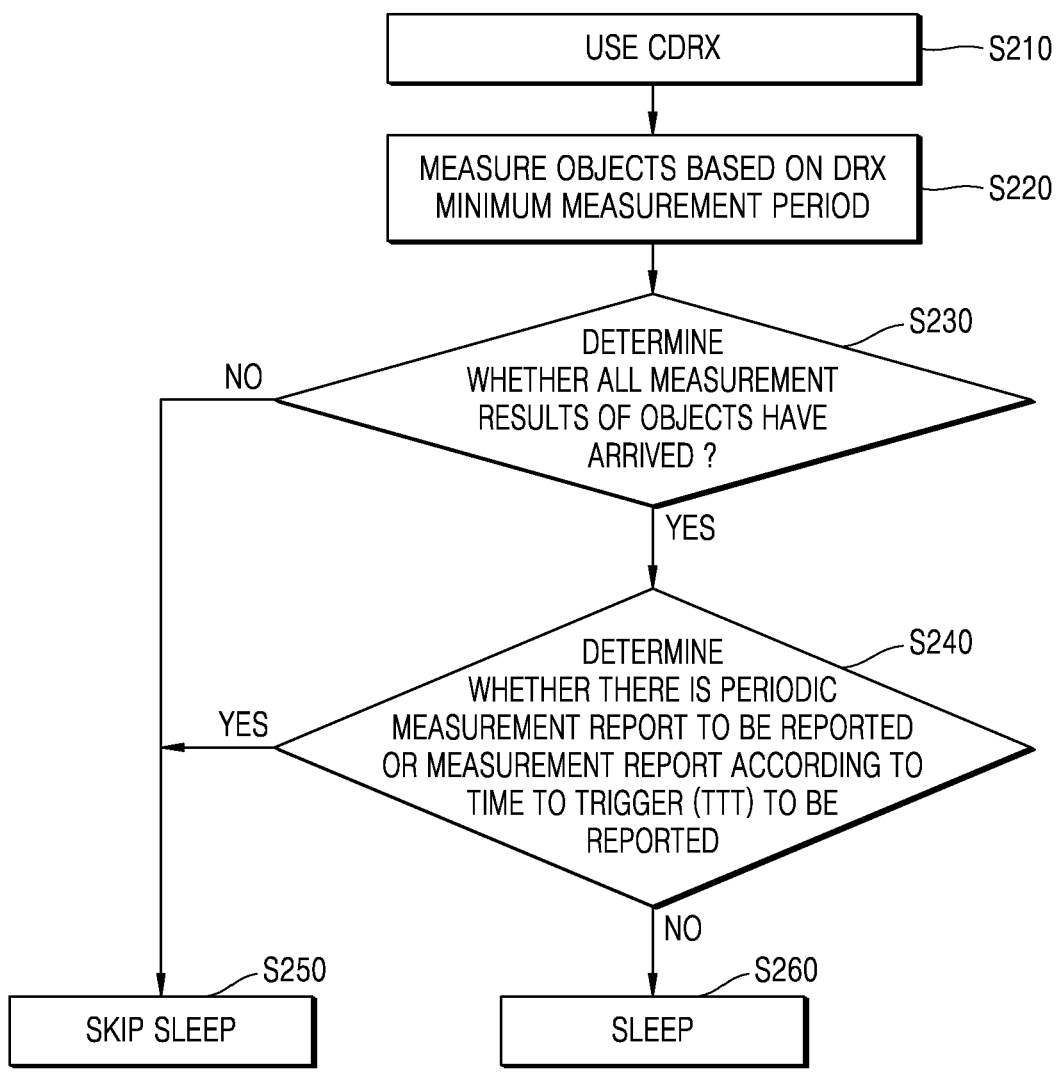
FIG. 2 is a flowchart illustrating a method of operating a user equipment (UE).

FIG. 2 is a flowchart illustrating a method of operating a UE.

In operation S210 of FIG. 2, a UE, as an example, may use connected mode discontinuous reception (CDRX). Although not shown in FIG. 2, in order for the UE to use CDRX, a CDRX usage condition may be checked. For example, as shown in Table 1, the UE may operate in accordance with RRC connected state requirements in DRX defined in Spec 38.133. The CDRX usage condition may correspond to none of the conditions in Table 1 being satisfied. For instance, the UE may use CDRX if none of the conditions in Table 1 are satisfied. Otherwise, the UE may avoid using CDRX (e.g., no DRX may be used).

TABLE 1

3.6.1 RRC connected state requirements in DRX

For the requirements in the RRC connected state, the UE shall assume that no DRX is used provided the following conditions are met:
DRX parameters are not configured or
DRX parameters are configured and
drx-InactivityTimer is running or
drx-RetransmissionTimerDL is running or
drx-RetransmissionTimerUL is running or
ra-ContentionResolutionTimer is running or
a Scheduling Request sent on PUCCH is pending or
a PDCCH indicating a new transmission addressed to the C-RNTI of the MAC entity has not been received after successful reception of a Random Access Response for the preamble not selected by the MAC entity
Otherwise the UE shall assume that discontinuous reception (DRX) is used.

If the CDRX usage condition is satisfied, the UE may use CDRX. Specifically, the UE may repeatedly sleep and wake up according to a DRX cycle. The time during which the UE is awake (e.g., after waking up) may be referred to as an on-duration time. For instance, the on-duration time may be a time during which the UE may be awake. The time during which the UE is sleeping may be referred to as an off-duration time or an inactivity time. Because the UE and a base station may not transmit and receive data while the UE is sleeping, the UE may reduce current consumption. Details associated with the UE sleeping and waking up according to the DRX cycle are described later.

In operation S220, the UE may measure objects based on a DRX minimum measurement period.

The DRX minimum measurement period may indicate a minimum time interval in which a UE using CDRX may report measurement results of objects to the base station at least once. The DRX minimum measurement period may be one of the DRX minimum measurement requirements. The DRX minimum measurement requirement or DRX minimum measurement period is defined in Spec 38.133. Accordingly, during the DRX minimum measurement period, if the UE does not report the measurement results of all objects to the base station at least once, the UE may not comply with standard specification requirements.

In operation S230, the UE may determine whether all measurement results of the objects have arrived at the UE (e.g., whether all measurement results are available or ready for reporting).

When all the measurement results of the objects have not arrived, the UE may not be able to sleep even if a time comes to sleep according to the DRX cycle. Specifically, in order to avoid violating the standard specification, the UE may sleep after all measurement results of objects are reported. Accordingly, when the measurement results of the objects have not all arrived, the UE may wait for the measurement results to arrive without sleeping. Also, according to the DRX cycle, the UE may be in a wake-up state even at the time to sleep (e.g., during an off-duration), and current consumption of the UE may be increased. Further details related to the DRX cycle are described later with reference to FIG. 4.

When all the measurement results of the objects arrive at the UE, the UE may report the measurement results to a base station. When the measurement results of objects are reported to the base station within a DRX minimum measurement period, it may be regarded that the standard specification has been complied with, and thus, the UE may sleep (operation S260). However, even if the UE has reported the measurement results of objects to the base station within the measurement period, if measurement reports to be additionally reported remain, the UE may not be able to sleep.

In operation S240, the UE may determine whether there is a periodic measurement report to be reported or a measurement report according to a Time to Trigger (TTT) to be reported.

The UE may have to periodically report the measurement results to the base station. Even when a time point for sleeping comes (e.g., at an initial boundary of an off-duration) in a DRX cycle, if the UE is to report a periodic measurement, the UE may not sleep. In other words, the UE may skip sleep (operation S250).

In some examples, the UE may report a measurement according to a TTT for reporting. For example, if a UE measures a signal strength of 3 dB or more for a cell other than the cell with which the UE is currently communicating, it may be appropriate for the UE to communicate with the cell. If the signal strength of 3 dB or more for the cell lasts for 10 ms or more, the UE may be instructed or configured to transmit a measurement report for the cell. Therefore, even if a time point 10 ms after the present time is a time point at which the UE may sleep in the DRX cycle, the UE may not sleep if the UE is to transmit a measurement report according to the TTT (e.g., after the TTT expires) (operation S250). In other words, even if a time point for sleeping comes in the DRX cycle, if the UE is to report a measurement according to the TTT, the UE may not sleep (operation S250).

In operation S250, when it is determined that not all measurement results of objects have arrived, the UE may skip sleeping. In addition, when it is determined that there is a periodic measurement report to be reported or a measurement report according to the TTT to be reported, the UE may skip sleep. Specifically, even if a time point for sleeping comes in the DRX cycle, a situation in which the UE may not sleep may occur, and current consumption of the UE may increase.

In operation S260, when it is determined that there is no periodic measurement report to be reported or no measurement report according to TTT to be reported, the UE may sleep.

FIG. 3 shows one or more aspects of measurement period information (e.g., intra-frequency measurement periods for intra-frequency measurements without gaps). In some aspects, the measurement period information may be (e.g., or include) a table defined in Spec 38.133. For instance, in some aspects, FIG. 3 shows equations for calculating a No DRX minimum measurement period and a DRX minimum measurement period. Specifically, based on a reference (No DRX) when CDRX is not used, an equation related to the No DRX minimum measurement period is expressed in FIG. 3. The No DRX minimum measurement period may be a period in which the UE may report the measurement results of objects to the base station at least once. In addition, equations related to the DRX minimum measurement period are expressed in FIG. 3. The DRX minimum measurement period may be a period in which the UE may report the measurement results of objects to the base station at least once based on the use of CDRX.

In the equations shown in FIG. 3, the No DRX minimum measurement period may be less than the DRX minimum measurement period. For example, assuming that Kp=1, SMTC period=20 ms, $CSSF_{intra}$=1, DRX cycle=320 ms, the No DRX minimum measurement period=max(200 ms, 5*20 ms)*1=200 ms, and the DRX minimum measurement period=max(200 ms, 8*320 ms)*1=2560 ms. Accordingly, when CDRX is not used, the UE may try to measure objects more frequently than when CDRX is used, and the UE may report measurement more frequently.

Figure 4:
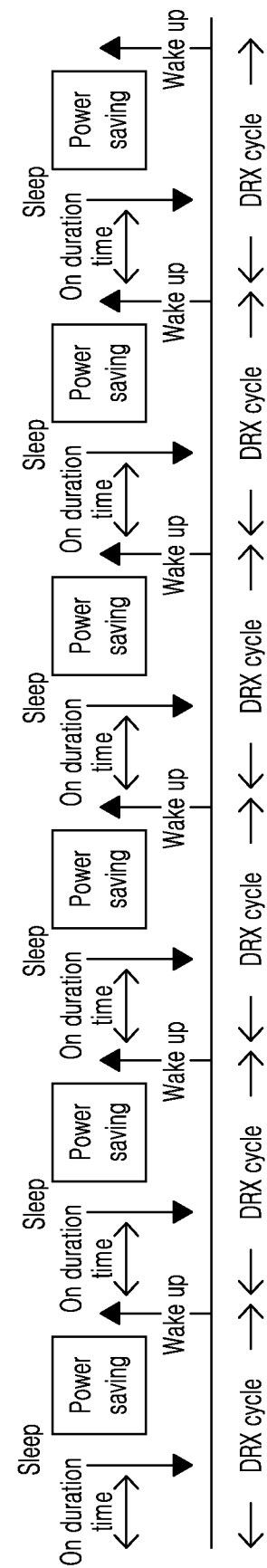
FIG. 4 is a timing diagram for describing a discontinuous reception (DRX) cycle according to one or more aspects of the present disclosure.

FIG. 4 is a timing diagram for describing a DRX cycle. In FIG. 4, the UE may repeatedly sleep and wakeup according to the DRX cycle. The UE may communicate with a base station for an on-duration time during which the UE is awake. In addition, the UE may not transmit/receive data to/from the base station by sleeping during the sleep period. Accordingly, the UE may reduce an amount of current consumption by sleeping. However, when the UE sleeps during every sleep cycle according to the DRX cycle, the UE may experience reduced performance in mobility (e.g., mobility performance). For instance, it may be challenging for the UE to perform suitable measurements to facilitate handovers to cells with which the UE may have better connections (e.g., a higher signal quality).

To improve mobility performance, it may be appropriate for the UE to measure objects with higher frequency and report measurement results. However, if the UE sleeps during every sleep cycle of the DRX cycle, the frequency of measuring objects and reporting the measurement results of the objects to the base station may decrease. Further, if the UE sleeps during every sleep cycle of the DRX cycle, the UE may not measure any objects (e.g., the measurement of objects may be omitted) even when the measurement of objects is expected (e.g., required). Accordingly, sleeping during every sleep cycle may reduce mobility performance, and the UE may be unable to perform efficient handovers to suitable cells. For instance, the UE may continue to communicate with one cell even if there is another cell associated with better measurements (e.g., signal quality measurements). As a result, the UE may experience reduced throughput, increased latency, increased power consumption, etc. A method of operating a UE, according to one or more aspects of the present disclosure, may increase communication quality or reduce current consumption of the UE by adaptively operating CDRX. For instance, the UE may support the configuration of a measurement schedule based on a No DRX minimum measurement period.

Figure 5:
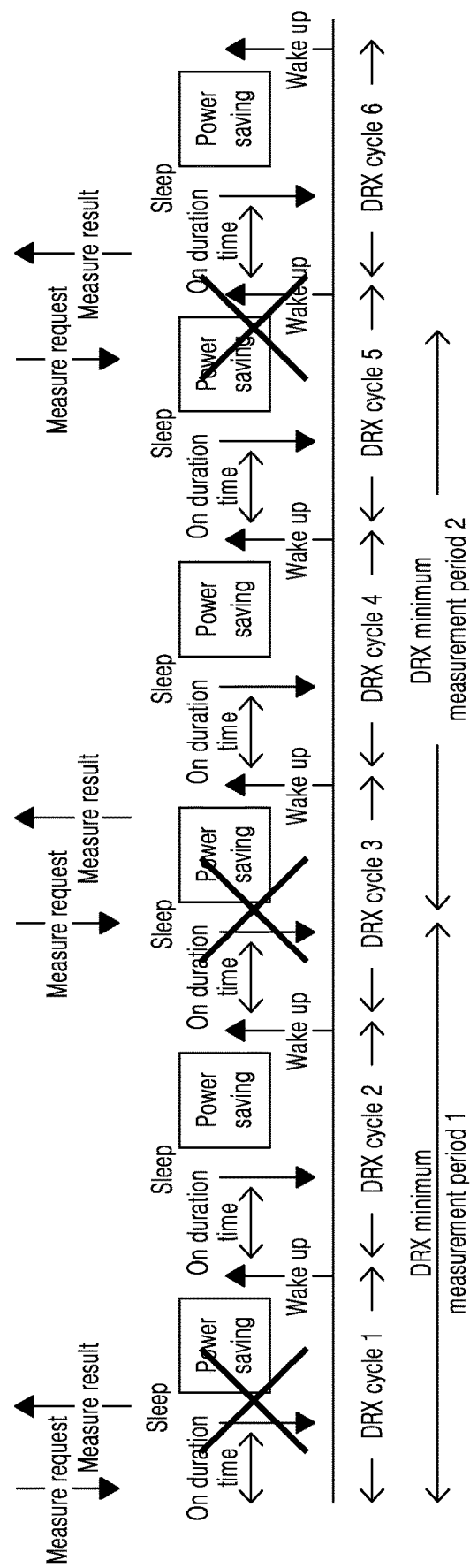
FIG. 5 is a timing diagram for explaining a DRX cycle according to one or more aspects of the present disclosure.

FIG. 5 is a timing diagram for explaining a DRX cycle.

In FIG. 5, the UE may not sleep even when a time point to sleep comes during the DRX cycle. For example, even when the time point for sleeping comes in DRX cycle 1, when the UE is configured to report the measurement results of objects to a base station, the UE may not sleep. Accordingly, because the UE did not sleep in DRX cycle 1, the current consumption may not be reduced.

When the time point for sleeping comes in DRX cycle 2, the UE may sleep. Specifically, because the UE reported the measurement results of the objects to the base station without sleeping in the DRX cycle 1 period, the UE has reported the measurement results of the objects to the base station at least once during the DRX minimum measurement period 1. Accordingly, the UE may satisfy the standard specification requirements, and the UE may sleep.

As an example, the UE may skip sleep in DRX cycle 3. The UE may satisfy the standard specification requirements for the DRX minimum measurement period 2 by skipping sleep in DRX cycle 3 and reporting the measurement results of objects to the base station. Accordingly, the UE may sleep in DRX cycle 4, which is a DRX cycle included in DRX minimum measurement period 2.

Similarly, the UE may skip sleep in DRX cycle 5, and, although not shown in FIG. 5, the standard specification requirement regarding the DRX minimum measurement period that exists thereafter may be satisfied. Accordingly, the UE may not skip sleep in DRX cycle 6.

When the UE skips sleep, mobility performance may be improved, but current consumption may be increased.

Figure 6:
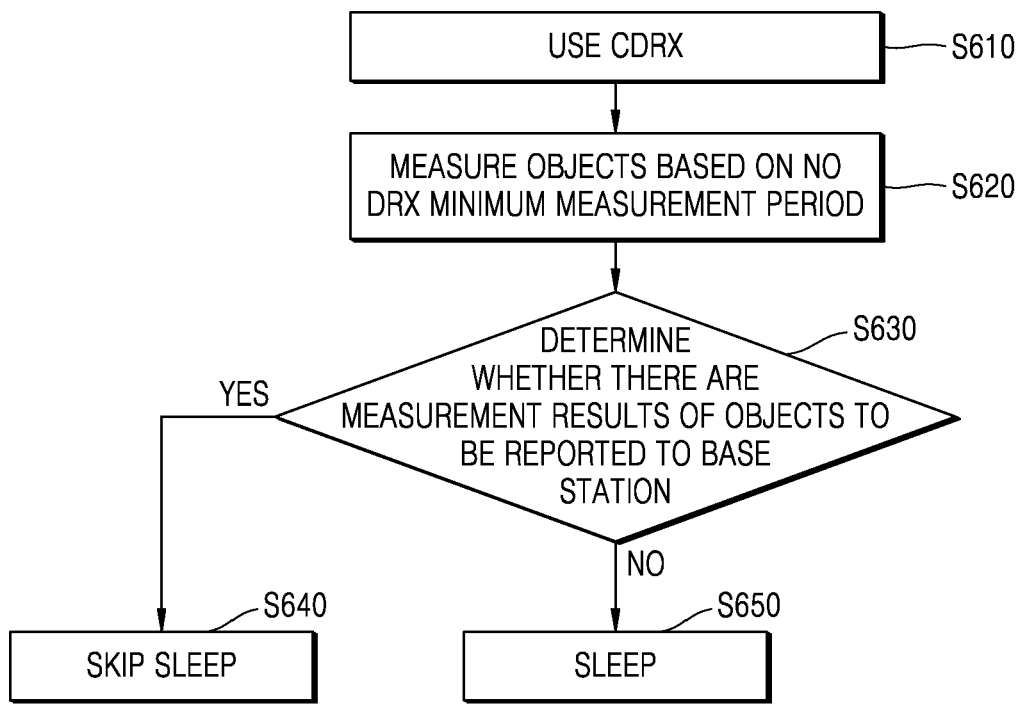
FIG. 6 is a flowchart illustrating a method of operating a UE according to one or more aspects of the present disclosure.

FIG. 6 is a flowchart illustrating a method of operating a UE, according to one or more aspects of the present disclosure.

In FIG. 6, a UE according to one or more aspects of the present disclosure may use CDRX in operation S610. Operation S610 may correspond to operation S210 described with reference to FIG. 2.

In operation S620, the UE may measure objects based on a No DRX minimum measurement period.

Even if the UE uses CDRX, the UE may attempt to measure objects within the No DRX minimum measurement period. In addition, even when a measurement schedule is determined based on the No DRX minimum measurement period, because the UE is using CDRX, the UE may satisfy the standard specification requirements for the DRX minimum measurement period, and the UE may not satisfy the standard specification requirements for the No DRX minimum measurement period. Further details related to the No DRX minimum measurement period and specification requirements are described later.

In operation S630, the UE may determine whether there are measurement results of objects to be reported to the base station. For example, if the measurement results of objects are not reported to the base station within the DRX minimum measurement period and the measurement results of objects do not arrive within an on-duration time of DRX, the UE may determine that there are measurement results of objects to be reported to the base station. Specifically, if the measurement results of objects are not reported to the base station within the DRX minimum measurement period, the standard specification requirement may not yet be satisfied. In addition, when the measurement results of the objects do not arrive within the on-duration time of DRX, the UE may not report the measurement results of the objects to the current base station, so the standard specification requirement may not be satisfied. Therefore, to satisfy the standard specification requirement, the UE may skip sleep and wait for the arrival of measurement results of objects.

In addition, when the measurement results of objects are reported to the base station within the DRX minimum measurement period, the UE may determine that there are no measurement results (e.g., no additional measurement results) of the objects to be reported to the base station. Specifically, when the measurement results of objects are reported to the base station within the DRX minimum measurement period, the UE may have satisfied the standard specification requirement. Accordingly, the UE may sleep without reporting the measurement results (e.g., additional measurement results) of the current objects. For example, even if the UE has attempted to measure objects, the UE may sleep without reporting the result of the measurement attempt, because the UE may have already satisfied the standard specification requirement for the DRX minimum measurement period. Accordingly, the UE may reduce the amount of current consumption while satisfying the standard specification requirements.

In addition, when it is determined that additional measurement of objects is appropriate based on status information of a modem, the UE may additionally measure the objects. Also, when the UE additionally measures objects, the UE may determine that there are measurement results of objects to be reported to the base station. In some examples, the UE may increase the frequency of sleeping based on status information of the modem. Specifically, when it is determined to reduce the current consumption even if the mobility performance of the UE is deteriorated, based on the status information of the modem, the UE may increase the frequency of sleeping.

Generally, a UE may include a modem, which may be implemented for various processing operations that enable and support wireless communications. For instance, a modem may perform functions related to modulation and demodulation of communication signals. The status information of the modem may include reference signal received power (RSRP) information, reference signal received quality (RSRQ) information, signal to interference noise ratio (SINR) information, and/or regional information. The regional information may include information on a region requiring high mobility performance. For example, the regional information may include information on whether an electric field corresponding to objects in a region is a strong electric field or a weak electric field. In addition, the regional information may include information on whether a region is one where the UE is periodically located.

Based on RSRP information, RSRQ information, SINR information, or regional information, when it is determined to improve the mobility performance of the current UE, the UE may perform additional measurements on objects and may report the measurement results to the base station. For example, when it is determined that a current RSRP value, an RSRQ value, or an SINR value is less than reference values, it may be appropriate to improve the mobility performance of the UE. Accordingly, when it is determined that the current RSRP value, the RSRQ value, or the SINR value is less than the reference values, the UE may perform additional measurements on objects and report the measurement results to the base station.

In some examples, the UE may determine, using the regional information, that the region where the UE is currently located is a region suitable for high mobility performance. For example, when an electric field corresponding to objects in the region where the UE is currently located is a weak electric field, the UE may determine that the corresponding region is a region suitable for high mobility performance. Accordingly, the UE may determine to improve the mobility performance in the region where the UE is currently located. To improve the mobility performance, the UE may additionally measure objects and report the measurement results to the base station. The UE may improve mobility performance by reporting the additional measurement results of objects. As the UE performs additional measurements on objects, the UE may skip sleep.

In some examples, the UE may reduce current consumption of the UE based on the regional information. For example, if the UE is located in a region where a handover is not appropriate or the UE is periodically located in the region, it may not be appropriate to increase the frequency of measuring objects even if the strength of a signal received from the base station is not strong. Accordingly, the UE may reduce current consumption by sleeping more frequently (e.g., increasing the frequency or length of off-durations) without increasing the frequency of measuring objects. Specifically, when it is determined that the region where the UE is currently located is a region where the UE is located periodically, such as on a commute region, based on regional information, the UE may report measurements without increasing the frequency of measuring objects, and the current consumption may be reduced by sleeping more frequently.

In some examples, the UE may support artificial intelligence (AI). Using a model, it may be possible to determine whether to increase the frequency of measuring current objects, whether to perform additional measurements on objects, whether to sleep more frequently, and the like. For example, the UE may determine whether it is currently appropriate to increase the mobility performance of the UE and whether it is effective to reduce the current consumption by inputting status information of a modem into an AI model.

Thus, the UE may improve the mobility performance when appropriate even if the current consumption increases, and conversely, even if the mobility performance decreases, the UE may reduce the current consumption when appropriate. That is, the UE may adaptively operate the CDRX or adapt CDRX operation according to the status information of a modem.

Also, when the TTT for the report of the measurement results of the objects is shorter than a scheduled off-duration time, the UE may determine that there are no results of the objects to be reported to the base station. In other words, the UE may sleep when the TTT for the report of the measurement results of the objects is shorter than a scheduled off-duration time. The UE may configure a sleep time for a time equal to or less than a corresponding TTT, and the UE may wake up after sleeping for the corresponding sleep time. After waking up, the UE may report measurement results of objects. More specific details related to TTT are described later.

In addition, the UE may periodically report the measurement results of objects to the base station. In addition, when a period for periodically reporting measurement results of objects is shorter than a predetermined off-duration time, the UE may determine that there are no measurement results of the objects to be reported to the base station. In other words, when the period for periodically reporting the measurement results of the objects is shorter than the predetermined off-duration time, the UE may not skip the sleep. The UE may configure a sleep time for a period less than or equal to the period in which the measurement results of objects are periodically reported, and the UE may wake up after sleeping for the corresponding sleep time. After waking up, the UE may report measurement results of objects. Further details related to periodically reporting the measurement results of objects are described later.

In operation S640, the UE may skip sleep. Specifically, when it is determined that there are measurement results of objects to be reported to the base station, the UE may skip sleep. The UE may skip sleep and report measurement results of objects to the base station.

In operation S650, the UE may sleep. Specifically, when it is determined that there are no measurement results of objects to be reported to the base station, the UE may sleep.

Although not shown in FIG. 6, the UE may adjust a DRX minimum measurement period based on the status information of the modem. For example, the UE may determine to improve the mobility performance of the current UE based on RSRP information, RSRQ information, SINR information, or regional information. Specifically, when it is determined that a current RSRP value, an RSRQ value, or an SINR value is less than the reference values, it may be determined that the mobility performance of the UE is to be improved. In addition, the UE may determine, using the regional information, that the region where the UE is currently located is a region suitable for high mobility performance. Accordingly, the UE may determine to improve the mobility performance in the region where the UE is currently located. When the UE determines to improve the mobility performance, the UE may reduce the DRX minimum measurement period compared to the existing measurement period. Specifically, when it is determined that a mobility performance greater than the current mobility performance is appropriate, the UE may determine to increase the frequency of reporting the measurement results of objects. Accordingly, by reducing the DRX minimum measurement period compared to the existing measurement period, the UE may increase the frequency of reporting the measurement results of objects and improve mobility performance.

Conversely, based on RSRP information, RSRQ information, SINR information, or regional information, the UE may determine to reduce current consumption of the UE rather than improving the mobility performance of the current UE. Specifically, when it is determined that a current RSRP value, an RSRQ value, or an SINR value is greater than reference values, it may be determined that it is appropriate to reduce the current consumption of the UE. In addition, the UE may determine, using the regional information, that the region where the UE is currently located is a region suitable for relatively low mobility performance. Accordingly, the UE may determine to reduce the current consumption rather than to improve the performance of the mobility. The UE may determine that the frequency of reporting the measurement results of objects may be reduced in order to reduce the amount of current consumption compared to the present current consumption. Accordingly, by increasing the DRX minimum measurement period compared to the existing measurement period, the UE may reduce the frequency of reporting measurement results of objects. Accordingly, the frequency at which the UE may sleep may be increased, and current consumption may be reduced.

Thus, the UE may efficiently operate a CDRX schedule by utilizing a suitable DRX minimum measurement period based on the latest status information of the modem.

Figure 7:
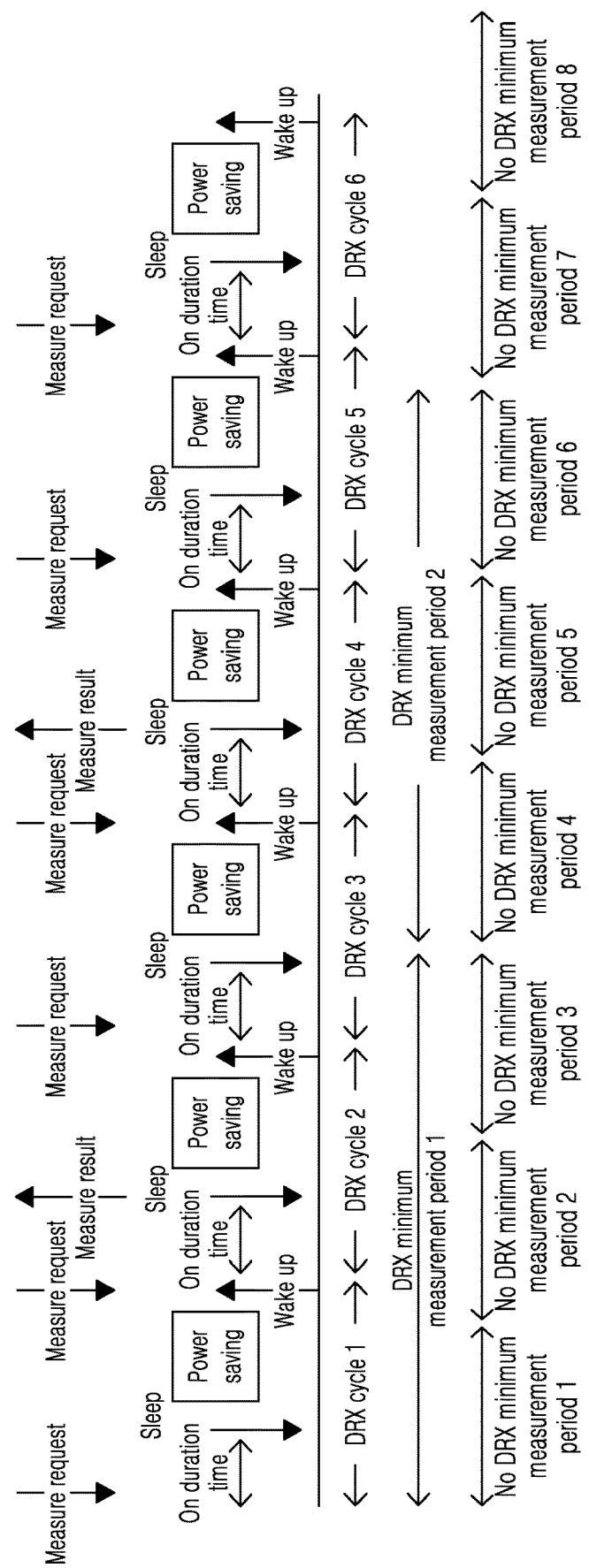
FIG. 7 is a timing diagram illustrating a method of operating a UE according to one or more aspects of the present disclosure.

FIG. 7 is a timing diagram illustrating a method of operating a UE according to one or more aspects of the present disclosure.

In FIG. 7, the UE, according to one or more aspects of the present disclosure, may use CDRX and may measure objects based on a No DRX minimum measurement period. For example, the UE may configure a measurement schedule based on the No DRX minimum measurement period. Configuring the measurement schedule based on the No DRX minimum measurement period may refer to configuring the UE to report measurement results of measurements performed on objects in each No DRX minimum measurement period. However, because the UE uses CDRX, it may not be appropriate for the UE to satisfy the standard specification requirement for the No DRX minimum measurement period. Instead, it is sufficient for the UE to satisfy the standard specification for the DRX minimum measurement period.

For example, the UE may not report measurement results of objects in DRX cycle 1. Specifically, even if the UE sleeps in DRX cycle 1, the UE may not violate the standard specification requirement for DRX minimum measurement period 1. Accordingly, the UE may sleep unless it is determined that it is currently appropriate to report the measurement results of the objects. Whether it is currently appropriate to report the measurement results of the objects may be determined based on status information of the modem. In addition, the UE may report the measurement results of objects in DRX cycle 2 to the base station.

As the UE configures a measurement schedule based on the No DRX minimum measurement period, objects may be measured at relatively short periods. Accordingly, the UE may report the measurement results of the objects to the base station by utilizing on-duration times of the DRX cycle. By reporting the measurement results of objects to the base station in the on-duration time, the UE may sleep in DRX cycle 2 as well. Also, the UE may sleep in DRX cycle 3. Specifically, because the UE reported the measurement results of objects to the base station in DRX cycle 2, the standard specification requirement for the DRX minimum measurement period 1 may be satisfied. Therefore, the UE may sleep without reporting the results of measurement attempts on the objects in DRX cycle 3. Accordingly, the UE may reduce current consumption. However, although not shown in FIG. 7, when it is determined that the UE is to improve mobility performance based on the status information of the modem, the UE may additionally report measurement results of objects after the standard specification requirement of the DRX minimum measurement period 1 is satisfied. For example, the UE may additionally report the measurement results of objects during the on-duration time of DRX cycle 3. Further, when it is determined that additional reporting is appropriate based on the status information of the modem, the UE may report the measurement results of the objects even while skipping sleep.

In some examples, the UE may also report measurement results of objects during the on-duration time of DRX cycle 4. Specifically, as shown in FIG. 7, because the UE did not report the measurement results of objects in DRX cycle 3, in order to satisfy the requirements of the standard specification for the DRX minimum measurement period 2, the UE may report the measurement results of the objects to the base station. Therefore, because the UE may not violate the requirements of the standard specification in DRX cycle 5, the UE may sleep.

Thus, by measuring the objects based on the No DRX minimum measurement period, the UE may have fewer cases to skip sleep than when measuring objects based on the DRX minimum measurement period (e.g., the case of FIG. 5). Accordingly, the UE may reduce current consumption through sleep.

The operation schedule of the UE shown in FIG. 7 is an example for understanding one or more aspects of the present disclosure, and the present disclosure is not limited thereto.

Figure 8:
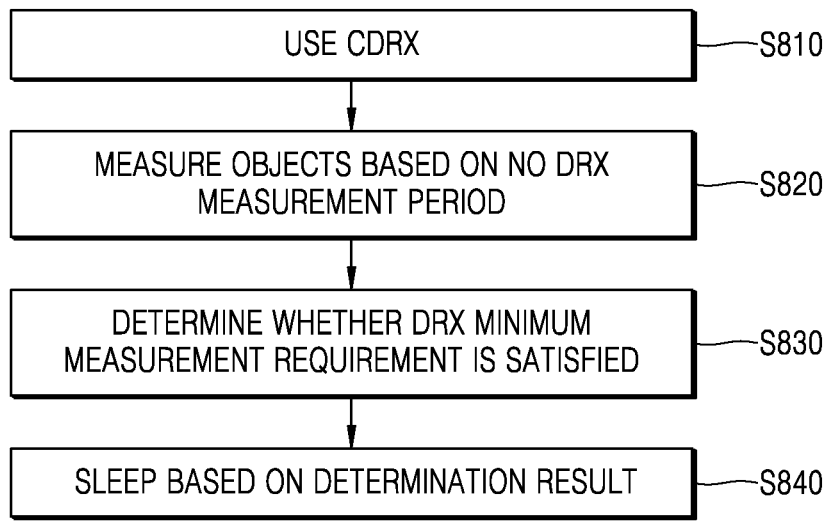
FIG. 8 is a flowchart illustrating a method of operating a UE according to one or more aspects of the present disclosure.

FIG. 8 is a flowchart illustrating a method of operating a UE, according to one or more aspects of the present disclosure.

In FIG. 8, the UE, according to one or more aspects of the present disclosure, may use CDRX in operation S810. Operation S810 may correspond to operation S210 of FIG. 2.

In operation S820, the UE may measure objects based on the No DRX measurement period.

In operation S830, the UE may determine whether the DRX minimum measurement requirement is satisfied. For example, the UE may determine whether the measurement results of the objects have been reported to the base station within the DRX minimum measurement period.

In operation S840, the UE may sleep based on the determination (e.g., determination result) of whether the DRX minimum measurement requirement is satisfied. For example, when the measurement results of objects within the DRX minimum measurement period are reported to the base station, the UE may sleep based on determining that the DRX minimum measurement requirement is satisfied. However, even when the measurement results of objects are reported to the base station within the DRX minimum measurement period, when it is determined that additional measurements of objects are appropriate based on the status information of the modem, the UE may additionally measure the objects and measurement results may be reported to the base station.

In addition, when measurement results of objects are reported to the base station within the DRX minimum measurement period and it is determined that additional measurements of objects are not to be reported based on the status information of the modem, the UE may sleep.

In addition, when the measurement results of the objects are not reported to the base station within the DRX minimum measurement period and the measurement results of the objects do not arrive within the on-duration time of the DRX, the UE may wait for the measurement results of the objects to arrive. Specifically, when the measurement results of objects are not reported to the base station within the DRX minimum measurement period, the standard specification requirement may not be satisfied. Accordingly, the UE may wait for the measurement results of the objects to arrive, and then the UE may report the measurement results to the base station. If measurement results of objects do not arrive during an on-duration of a DRX cycle, the UE may skip sleep.

In some examples, the UE may adjust the DRX minimum measurement requirement based on the status information of the modem. By adjusting the DRX minimum measurement requirement based on the status information of a modem, the UE may dynamically determine whether the mobility performance is to be improved or not, and the UE may efficiently operate in accordance with a CDRX schedule.

Figure 9:
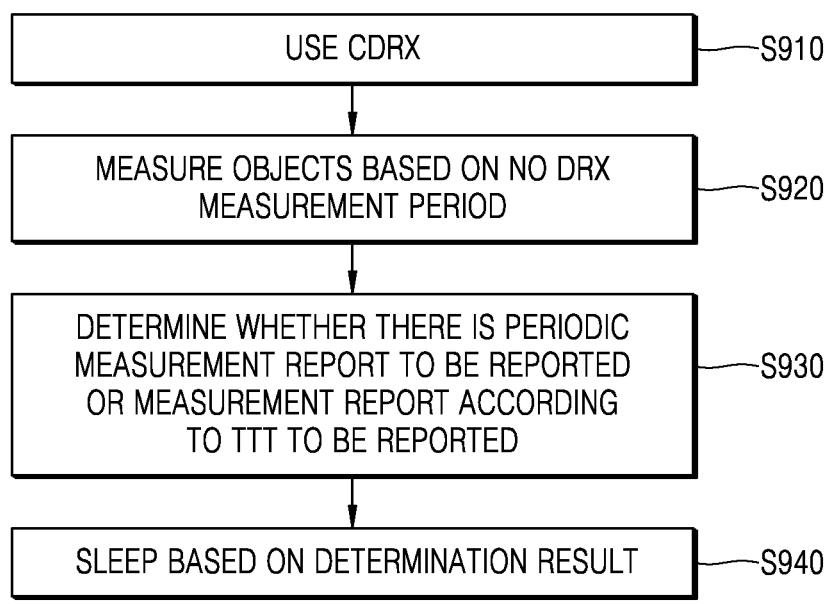
FIG. 9 is a flowchart illustrating a method of operating a UE according to one or more aspects of the present disclosure.

FIG. 9 is a flowchart illustrating a method of operating a UE according to one or more aspects of the present disclosure.

In FIG. 9, the UE, according to one or more aspects of the present disclosure, may use CDRX in operation S910. Operation S910 may correspond to operation S210 of FIG. 2.

In operation S920, the UE may measure objects based on the No DRX measurement period.

In operation S930, the UE may determine whether there is a periodic measurement report to be reported or a measurement report according to TTT to be reported. In operation S940, the UE may sleep based on the determination of whether there is a periodic measurement report to be reported or a measurement report according to TTT to be reported. Specifically, there may be no measurement results of objects to be reported to the base station in the UE, but measurement results of objects to be reported to the base station may occur over time. For example, even if there are currently no measurement results of objects to be reported to the base station, a periodic measurement report or a measurement report according to TTT may be required over time. When a periodic measurement report or a measurement report according to TTT is to be reported, the UE may skip sleep to transmit the corresponding report. However, when the TTT for the report of the measurement results of the objects is less than a scheduled off-duration period, the UE may sleep for a time equal to or less than the TTT. Also, when a period for periodically reporting the measurement results of the objects is less than the predetermined off-duration time, the UE may sleep for a time equal to or less than the period for periodically reporting the measurement results of the objects. For example, if it is assumed that the scheduled off-duration time is 320 ms and the TTT is 80 ms, the UE may sleep for about 60 ms and wake up, then the UE may transmit a measurement report according to the TTT. In other words, the UE may sleep until just before transmitting a measurement report according to the TTT (e.g., after the TTT expires) or just before transmitting a periodic measurement report. Thus, the UE may transmit a measurement report by waking up after sleeping even for a short time without skipping sleep entirely (e.g., for an entire off-duration). Accordingly, the UE may reduce current consumption.

Figure 10:
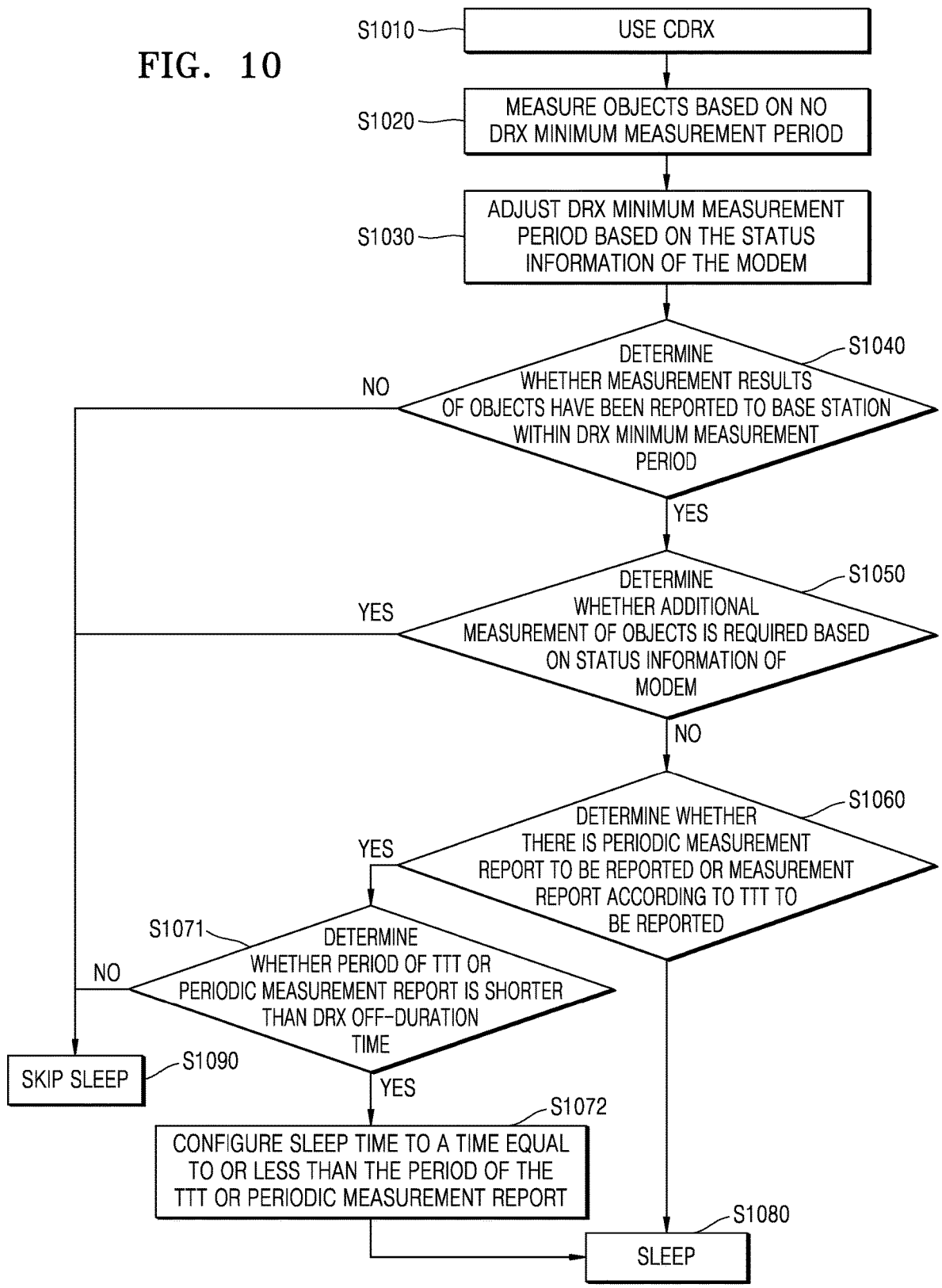
FIG. 10 is a flowchart illustrating a method of operating a UE according to one or more aspects of the present disclosure.

FIG. 10 is a flowchart illustrating a method of operating a UE according to one or more aspects of the present disclosure. In FIG. 10, a UE, according to one or more aspects of the present disclosure, may use CDRX in operation S1010.

Operation S1010 may correspond to operation S210 of FIG. 2.

In operation S1020, the UE may measure objects based on a No DRX minimum measurement period. In operation S1030, the UE may adjust the DRX minimum measurement period based on the status information of the modem. For example, the UE may determine that it is appropriate to improve the mobility performance of the UE based on RSRP information, RSRQ information, SINR information, or regional information. Specifically, when it is determined that a current RSRP value, an RSRQ value, or an SINR value is less than a reference value, the UE may determine that the mobility performance of the UE is to be improved. In addition, the UE may determine, using regional information, that the region where the UE is currently located is a region suitable for high mobility performance. Accordingly, the UE may determine that it is appropriate to improve the mobility performance in the region where the UE is currently located. When the UE determines that it is appropriate to improve the mobility performance, the UE may reduce the DRX minimum measurement period compared to the existing period. Specifically, when it is determined that a higher mobility performance than the current mobility performance is appropriate, the UE may determine to increase the frequency of reporting the measurement results of objects.

Accordingly, by reducing the DRX minimum measurement period compared to the existing period, the UE may increase the frequency of reporting the measurement results of objects and improve mobility performance. Conversely, based on RSRP information, RSRQ information, SINR information, or regional information, the UE may determine that it is appropriate to reduce the current consumption of the UE rather than improving the mobility performance of the UE. Specifically, when it is determined that the current RSRP value, the RSRQ value, or the SINR value is greater than a reference value, it may be determined that it is appropriate to reduce the current consumption of the UE. In addition, the UE may determine, using the regional information, that the region where the UE is currently located is a region suitable for relatively low mobility performance. Accordingly, the UE may determine that it is appropriate to reduce the current consumption rather than to improve the mobility performance. The UE may determine that the frequency of reporting the measurement results of the objects may be reduced in order to reduce consumption compared to the current consumption. Accordingly, by increasing the minimum DRX measurement period, the UE may reduce the frequency of reporting measurement results of objects. Accordingly, the UE may sleep more frequently, and current consumption may be reduced.

The UE may operate CDRX more efficiently by adjusting a DRX minimum measurement requirement based on status information of the modem. In operation S1040, the UE may determine whether the measurement results of the objects have been reported to the base station within the DRX minimum measurement period. If the UE did not report the measurement results of objects to the base station within the DRX minimum measurement period, the standard specification requirement may not be satisfied. Accordingly, the UE may skip sleep (operation S1090). However, although not shown in FIG. 10, even if the measurement results of objects are not reported to the base station within the DRX minimum measurement period, when the measurement results of objects arrive at the UE within an on-duration time of a DRX cycle, the UE may sleep. In other words, because reportable measurement results may be secured in the UE, the UE may preferentially sleep in order to reduce current consumption.

The UE may satisfy the standard specification requirement regarding the DRX minimum measurement period by reporting measurement results of objects within a subsequent on-duration time of the DRX cycle within the DRX minimum measurement period. In operation S1050, the UE may determine whether to perform additional measurements of objects based on the status information of the modem. When it is determined to perform additional measurements of objects, the UE may perform the additional measurements and skip sleep.

Also, when it is determined that additional measurements of objects are not appropriate, the UE may perform operation S1060. For example, when it is determined that it is appropriate to improve the mobility performance of the current UE based on RSRP information, RSRQ information, SINR information, or regional information, the UE may perform additional measurements on objects, and the measurement results may be transmitted to the base station. When it is determined that a current RSRP value, an RSRQ value, or an SINR value is less than a reference value, it may be determined that the mobility performance of the UE is to be improved.

Accordingly, when it is determined that the current RSRP value, RSRQ value, or SINR value is less than the reference value, the UE may perform additional measurements on objects and report the measurement results to the base station. In addition, the UE may determine, using the regional information, that the region in which the UE is currently located is a region suitable for high mobility performance. Accordingly, the UE may determine that it is appropriate to improve the mobility performance in the region where the UE is currently located. To improve mobility performance, the UE may additionally measure objects and report the measurement results to the base station. The UE may improve mobility performance due to additional reporting of measurement results of objects.

In operation S1060, the UE may determine whether there is a periodic measurement report to be reported or a measurement report according to the TTT to be reported.

When it is determined that there is no periodic measurement report to be reported or no measurement report according to TTT to be reported, the UE may sleep (operation S1080). If it is determined that a periodic measurement report is to be reported or a measurement report according to the TTT is to be reported, the UE may determine whether the period of the TTT or periodic measurement report is shorter than a DRX off-duration time in operation S1071. When the period of the TTT or periodic measurement report is shorter than the DRX off-duration time, the UE may configure the sleep time to a time equal to or less than the period of the TTT or periodic measurement report in operation S1072. Also, the UE may sleep in operation S1080 based on the configured sleep time.

A sleep time (e.g., duration) configured in operation S1072 may correspond to a short sleep having a shorter sleep time compared to the sleep time of a general DRX cycle.

If the period of TTT or periodic measurement report is not shorter than the DRX off-duration time, the UE may skip sleep in operation S1090.

Figure 11:
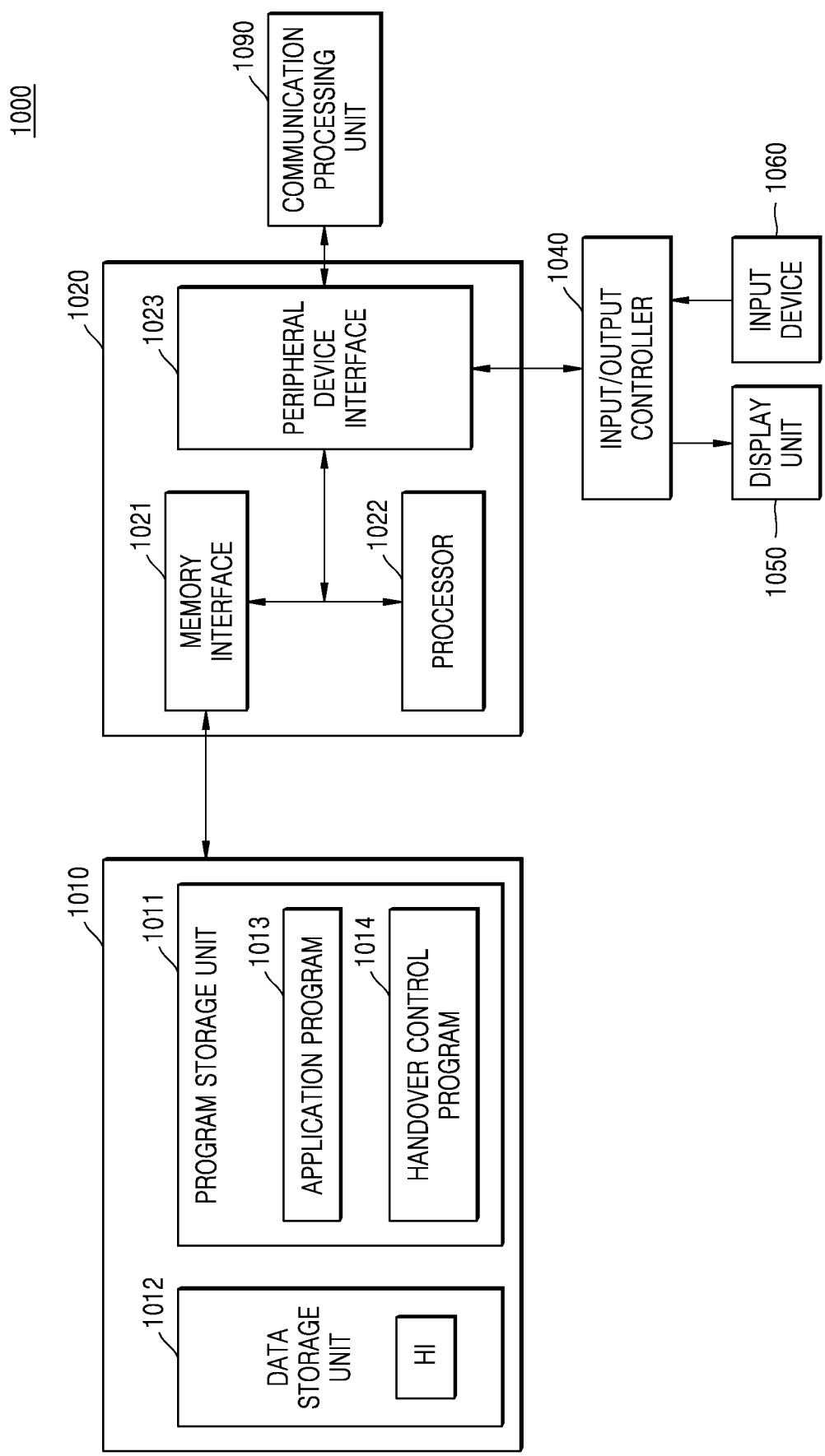
FIG. 11 is a block diagram illustrating an electronic device according to one or more aspects of the present disclosure.

FIG. 11 is a block diagram illustrating an electronic device 1000 according to one or more aspects of the present disclosure.

The electronic device 1000 may correspond to the aforementioned UE. In FIG. 11, the electronic device 1000 may include a memory 1010, a processor unit 1020, an input/output controller 1040, a display unit 1050, an input device 1060, and a communication processing unit 1090. Here, the memory 1010 may include a plurality of memories.

The memory 1010 may include a program storage unit 1011 configured to store programs for controlling the operation of the electronic device 1000 and a data storage unit 1012 configured to store data generated during program execution.

The data storage unit 1012 may store data used for the operation of an application program 1013 and a handover control program 1014. The program storage unit 1011 may include the application program 1013 and the handover control program 1014. Here, the programs included in the program storage unit 1011 may be expressed as an instruction set (e.g., a set of instructions). The application program 1013 may include program code for executing various applications operating in the electronic device 1000.

That is, the application program 1013 may include code (or commands) related to various applications driven by a processor 1022. In addition, the electronic device 1000 may include the communication processing unit 1090 configured to perform communication functions for voice communication and data communication.

The processor 1022 may receive the RRC reset message from a source cell through the communication processing unit 1090, and in response to the RRC reset message, perform a measurement operation on objects, and may report a measurement result of a specific object that satisfies a predetermined condition to the source cell through the communication processing unit. 1090. A peripheral device interface 1023 may control connections between the input/output controller 1040, the communication processing unit 1090, the processor 1022, and a memory interface 1021. In some aspects, the processor 1022 controls a plurality of cells to provide corresponding services using at least one software program.

In this case, the processor 1022 may execute at least one program stored in the memory 1010 to provide a service corresponding to the program. The input/output controller 1040 may provide an interface between an input/output device, such as the display unit 1050 and the input device 1060, and the peripheral device interface 1023. The display unit 1050 displays status information, input text, a moving picture, a still picture, and the like.

For example, the display unit 1050 may display application program information driven by the processor 1022. The input device 1060 may provide input data generated by selection of the electronic device 1000 to the processor unit 1020 through the input/output controller 1040. In this case, the input device 1060 may include a keypad including at least one hardware button and a touch pad for sensing touch information.

For example, the input device 1060 may provide touch information, such as a touch sensed through a touch pad, a touch movement, and a touch release to the processor 1022 through the input/output controller 1040.

A processor 1020 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 1020 is configured to operate a memory array using a memory controller. In other cases, a memory controller is integrated into the processor 1020. In some cases, the processor 1020 is configured to execute computer-readable instructions stored in a memory to perform various functions. In some embodiments, a processor 1020 includes special purpose components for modem processing, baseband processing, digital signal processing, or transmission processing.

Examples of a memory 1010 may include random access memory (RAM), read-only memory (ROM), or a hard disk. Examples of memory 1010 may include solid state memory, hard disk drive, etc. In some examples, memory 1010 may be used to store computer-readable, computer-executable software including instructions that, when executed, cause a processor 1020 to perform various functions described herein. In some cases, the memory 1010 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Figure 12:
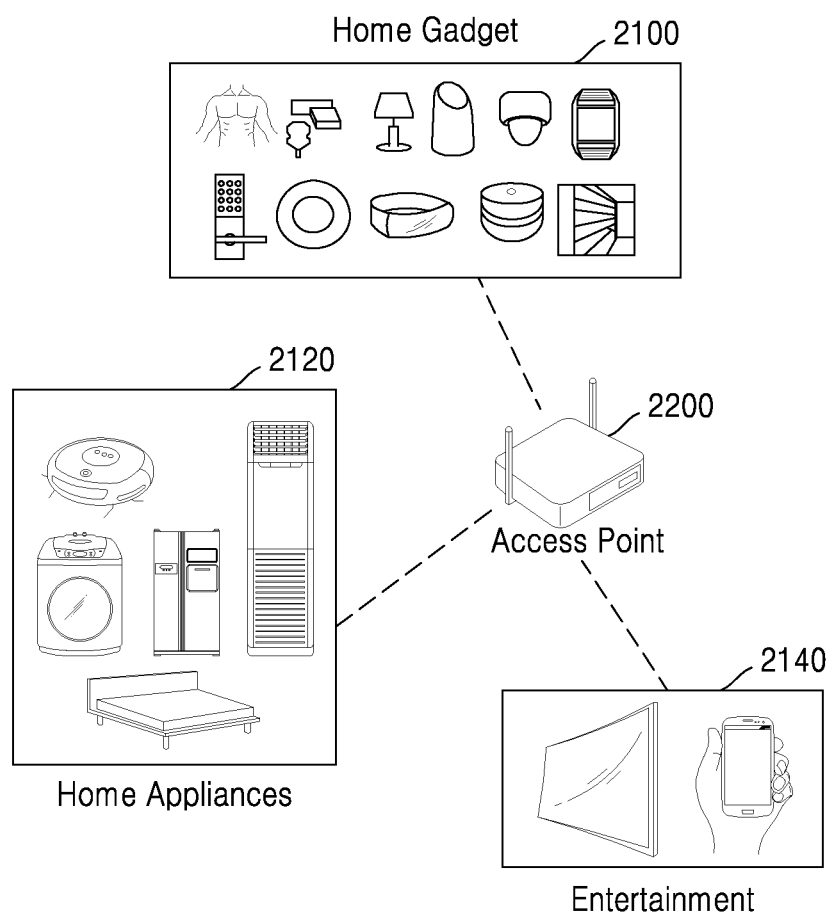
FIG. 12 is a diagram illustrating communication devices performing a handover operation according to one or more aspects of the present disclosure.

FIG. 12 is a diagram illustrating communication devices performing an operation according to one or more aspects of the present disclosure. In FIG. 12, home gadgets 2100, home appliances 2120, entertainment devices 2140, and an access point (AP) 2200 may perform operations according to one or more aspects of the present disclosure.

A plurality of APs 2200 may be located at various points, respectively, and the home gadgets 2100, the home appliances 2120, and the entertainment devices 2140 may be handed over from any one of the plurality of APs 2200 to another based on a measurement operation according to one or more aspects of the present disclosure. In some embodiments, the home gadgets 2100, the home appliances 2120, the entertainment devices 2140, and the AP 2200 may constitute an Internet of Things (IoT) network system.

It will be understood that the communication devices shown in FIG. 12 are only examples, and a wireless communications device according to one or more aspects of the present disclosure may be an example of other communication devices not shown in FIG. 12. As described herein, one or more aspects of the present disclosure have been disclosed in the drawings and specification. In the present specification, the example embodiments are described by using some specific terms, but the terms used are for the purpose of describing the technical scope of the present disclosure only and are not intended to be limiting of meanings or the technical scope described in the claims. Therefore, it will be understood by those skilled in the art that various changes in form and details may be made therein without departing from the spirit and scope of the inventive concept.

Accordingly, the scope of the present disclosure is defined not by the detailed description of the invention but by the appended claims.

While the present disclosure has been particularly shown and described with reference to embodiments thereof, it will be understood that various changes in form and details may be made therein (e.g., by analogy) without departing from the spirit and scope of the following claims.

What is claimed is:

1. A method of wireless communications, the method comprising:
   using Connected mode Discontinuous Reception (CDRX);
   measuring objects based at least in part on a minimum measurement period configured when no discontinuous reception (DRX) is used, wherein the minimum measurement period comprises a No DRX minimum measurement period that is shorter than a DRX minimum measurement period;
   determining whether there are measurement results of the objects to be reported to a base station; and
   sleeping based at least in part on a DRX cycle when there are no measurement results of the objects to be reported to the base station.

2. The method of claim 1, wherein the determining whether there are measurement results of the objects to be reported to the base station includes adjusting the DRX minimum measurement period based on status information of a modem.

3. The method of claim 2, wherein the status information of a modem includes Reference Signal Received Power (RSRP) information, Reference Signal Received Quality (RSRQ) information, Signal to Interference Noise Ratio (SINR) information, or regional information.

4. The method of claim 3, wherein the determining whether there are measurement results of the objects to be reported to the base station includes additionally measuring the objects based at least in part on the status information of a modem.

5. The method of claim 4, wherein the determining whether there are measurement results of the objects to be reported to the base station includes determining that there are measurement results of the objects to be reported to the base station when the objects are additionally measured.

6. The method of claim 1, wherein the determining whether there are measurement results of the objects to be reported to the base station includes determining that there are measurement results of the objects to be reported to the base station when the measurement results of the objects are not reported to the base station within the DRX minimum measurement period or the measurement results of the objects have not arrived within an on-duration time of DRX.

7. The method of claim 1, wherein the determining whether there are measurement results of the objects to be reported to the base station includes determining that there are no measurement results of the objects to be reported to the base station when the measurement results of the objects are reported to the base station within the DRX minimum measurement period.

8. The method of claim 1, wherein the determining whether there are measurement results of the objects to be reported to the base station includes determining that there are no measurement results of the objects to be reported to the base station when a Time to Trigger (TTT) for reporting the measurement results of the objects is shorter than a predetermined off-duration time.

9. The method of claim 8, wherein the sleeping based on the DRX cycle includes reporting the measurement results of the objects after sleeping for a time less than or equal to the TTT, which is shorter than the predetermined off-duration time.

10. The method of claim 1, further comprising:
    periodically reporting the measurement results of the objects to the base station, wherein determining whether there are measurement results of the objects to be reported to the base station includes determining that there are no measurement results of the objects to be reported to the base station when a period for periodically reporting the measurement results of the objects is shorter than a predetermined off-duration time.

11. The method of claim 10, wherein the sleeping based on the DRX cycle includes reporting the measurement results of the objects after sleeping for a time equal to or less than the period of periodically reporting the measurement results of the objects.

12. The method of claim 1, further comprising:
    reporting measurement results of the objects according to the DRX minimum measurement period.

13. A method of operating a user equipment (UE), the method comprising:
    using Connected mode Discontinuous Reception (CDRX);
    measuring objects based at least in part on a minimum measurement period configured when no discontinuous reception (DRX) is used, wherein the minimum measurement period comprises a No DRX minimum measurement period that is shorter than a DRX minimum measurement period;
    determining whether a DRX minimum measurement requirement is satisfied; and
    sleeping based at least in part on the determination.

14. The method of claim 13, wherein the DRX minimum measurement requirement indicates that measurement results of the objects are to be reported to a base station within the DRX minimum measurement period.

15. The method of claim 14, wherein the sleeping includes additionally measuring the objects when the measurement results of the objects are reported to the base station within the DRX minimum measurement period and it is determined that the UE is to perform the additional measurements of the objects based at least in part on status information of a modem.

16. The method of claim 14, wherein the sleeping includes sleeping when the measurement results of the objects are reported to the base station within the DRX minimum measurement period and it is determined that the UE is to avoid performing additional measurements of the objects based at least in part on status information of a modem.

17. The method of claim 14, wherein the sleeping includes waiting for the measurement results of the objects to arrive when the measurement results of the objects have not been reported to the base station within the DRX minimum measurement period or the measurement results of the objects have not arrived within an on-duration time of DRX.

18. The method of claim 13, further comprising adjusting a DRX minimum measurement requirement based at least in part on status information of a modem.

19. A method of wireless communications, the method comprising:
- determining a Connected mode Discontinuous Reception (CDRX) cycle of a CDRX mode, the CDRX cycle comprising on-durations and off-durations;
- measuring objects during an on-duration of the CDRX cycle based at least in part on a minimum measurement period configured when no discontinuous reception (DRX) is used, wherein the minimum measurement period comprises a No DRX minimum measurement period that is shorter than a DRX minimum measurement period;
- determining, before an off-duration of the CDRX cycle and based at least in part on measuring the objects, to report measurement results of the objects to a base station; and
- skipping sleep during the off-duration of the CDRX cycle based at least in part on determining to report the measurement results of the objects to the base station.

* * * * *